United States Patent
Liu

(10) Patent No.: US 8,766,478 B2
(45) Date of Patent: Jul. 1, 2014

(54) POWER SYSTEM AND CONTROL METHOD THEREOF

(76) Inventor: Ching Hsiung Liu, Tainan (TW)

( * ) Notice: Subject to any disclaimer, the term of this patent is extended or adjusted under 35 U.S.C. 154(b) by 448 days.

(21) Appl. No.: 12/676,897

(22) PCT Filed: Sep. 11, 2007

(86) PCT No.: PCT/IB2007/053663
§ 371 (c)(1),
(2), (4) Date: Sep. 13, 2010

(87) PCT Pub. No.: WO2009/034420
PCT Pub. Date: Mar. 19, 2009

(65) Prior Publication Data
US 2011/0018354 A1    Jan. 27, 2011

(51) Int. Cl.
*H02J 1/00* (2006.01)

(52) U.S. Cl.
USPC ............... 307/82; 307/39; 307/64; 363/37; 363/65; 363/17; 323/271; 323/272; 323/276; 323/283; 323/284

(58) Field of Classification Search
CPC ............ H02J 3/14; H02J 9/062; H02J 1/102; H02M 3/3376; H02M 3/1588; H02M 3/156
USPC ...................... 307/39, 64, 82; 363/37, 65, 17; 323/272, 284, 283, 276
See application file for complete search history.

(56) References Cited

U.S. PATENT DOCUMENTS

| | | | | |
|---|---|---|---|---|
| 5,982,156 A | * | 11/1999 | Weimer et al. | 323/222 |
| 6,009,000 A | * | 12/1999 | Siri | 363/21.09 |
| 6,169,669 B1 | * | 1/2001 | Choudhury | 363/37 |
| 6,177,783 B1 | * | 1/2001 | Donohue | 323/272 |
| 6,487,097 B2 | * | 11/2002 | Popescu | 363/56.09 |
| 6,574,124 B2 | * | 6/2003 | Lin et al. | 363/65 |
| 6,753,622 B2 | * | 6/2004 | Oughton, Jr. | 307/64 |
| 6,788,036 B1 | * | 9/2004 | Milavec et al. | 323/272 |
| 6,900,624 B2 | * | 5/2005 | Abo | 323/284 |
| 7,479,772 B2 | * | 1/2009 | Zane et al. | 323/272 |
| 7,489,119 B2 | * | 2/2009 | Smith et al. | 323/283 |
| 7,511,462 B2 | * | 3/2009 | Wang | 323/265 |
| 7,518,886 B1 | * | 4/2009 | Lai et al. | 363/17 |
| 7,781,909 B2 | * | 8/2010 | Ozawa et al. | 307/39 |

* cited by examiner

Primary Examiner — Jared Fureman
Assistant Examiner — Alfonso Perez Borroto

(57) ABSTRACT

A power system and a control method thereof are disclosed. The power system comprises: providing a plurality of power sources; electrically connecting a plurality of converters between the power sources and at least one load, wherein the converters are electrically connected to the power sources respectively in a one-to-one manner; and positive feed-forward controlling each of the converters by using a positive feed-forward control circuit electrically connected to one of the power sources in a one-to-one manner, for the use to protect the input voltage source from over-current drawing by reducing the input current of the converter when the source voltage drops, regardless constant output-voltage.

45 Claims, 7 Drawing Sheets

US 8,766,478 B2

POWER SYSTEM AND CONTROL METHOD THEREOF

TECHNICAL FIELD

This invention relates to a power system and a control method thereof, and more particularly, to a power system with positive feed-forward control and a controlling method thereof, for the use to protect the input voltage source from over-current drawing by reducing the input current of the converter when the source voltage drops, regardless constant output-voltage.

BACKGROUND ART

Recently, the characteristics of power electronic devices have been improved significantly. Power electronic devices with high-voltage rating, high-current rating, and high switching speeds have been developed due to the improvement of semiconductor manufacturing techniques. Power electronic devices are applied in electric power equipment, such as switching power supplies, uninterruptible power supplies, motor drivers, arc furnaces, trolley cars, battery chargers, lighting appliances etc. For example, converters are well known in the field of electronics, such as DC-to-DC, DC-to-AC, AC-to-DC or AC-to-AC converters. Such circuitry or devices are typically employed to convert from one DC or AC voltage to another DC or AC voltage.

Typically, there are several kinds of power systems using the converters, such as central power system (CPS) or distributed power system (DPS). Refer to FIG. 1. FIG. 1 is a system block diagram showing a conventional central power system. In the central power system, a single input power source 911 is electrically connected to a DC-to-DC converter 912 and a plurality of loadings 913 (such as electronic devices). The input power source 911 may be a DC power source. The DC-to-DC converter 912 is employed to convert from one DC voltage level to another DC voltage level. Therefore, the input power source 911 can supply power to the loadings 913. However, there are some disadvantages in the central power system, such as high current stress on devices, poor reliability and difficulty in power maintenance etc.

Refer to FIG. 2. FIG. 2 is a system block diagram showing a conventional distributed power system. In the distributed power system, a single input power source 921 is electrically connected to a plurality of DC-to-DC converters 922 and a plurality of loadings 923 (such as electronic devices), wherein each of the DC-to-DC converters 922 is electrically connected to each of the loadings 923, thereby supplying power to the loadings 923. There are some advantages in the distributed power system, such as lower current stress on devices, supporting of N+1 redundancy, ease to maintenance and customization using standardized module etc. However, when the single input power source 921 is broken-down or fails to supply power, the whole distributed power system would be useless.

DISCLOSURE OF INVENTION

Therefore, an aspect of the present invention is to provide a power system and a control method thereof to positive feed-forward control the paralleling converters, thereby self-regulating the output status of each of the power sources, for the use to protect the input voltage source from over-current drawing by reducing the input current of the converter when the source voltage drops, regardless constant output-voltage.

Another aspect of the present invention is to provide a power system with a plurality of power sources and a plurality of converters electrically connected thereto respectively in a one-to-one manner, thereby allowing each of the power sources to be replaceable.

According to an embodiment of the present invention, the power system comprises a plurality of power sources, a plurality of converters and at least one load. The converters are electrically connected to the power sources respectively in a one-to-one manner, wherein each of the converters comprises a positive feed-forward control circuit which is electrically connected to one of the power sources in a one-to-one manner for providing a feed-forward control signal to positive feed-forward control each of the converters, for the use to protect the input voltage source from over-current drawing by reducing the input current of the converter when the source voltage drops, regardless constant output-voltage. The load is electrically connected to the converters.

According to another embodiment of the present invention, the method for controlling a power system comprises: providing a plurality of power sources; electrically connecting a plurality of converters between the power sources, and at least one load, wherein the converters are electrically connected to the power sources respectively in a one-to-one manner; and positive feed-forward controlling each of the converters by using a positive feed-forward control circuit electrically connected to one of the power sources in a one-to-one manner, for the use to protect the input voltage source from over-current drawing by reducing the input current of the converter when the source voltage drops, regardless constant output-voltage.

Therefore, with the application of the power system and the control method thereof disclosed in the embodiments of the present invention, the converters are adapted to self-regulate the output current (or output voltage) supplied to the load respectively according to the input status of each the power sources, thereby enhancing the power efficiency and life time of the power system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

BEST MODE FOR CARRYING OUT THE INVENTION

In order to make the illustration of the present invention more explicit and complete, the following description is stated with reference to FIG. 3 through FIG. 11.

Figure 2:
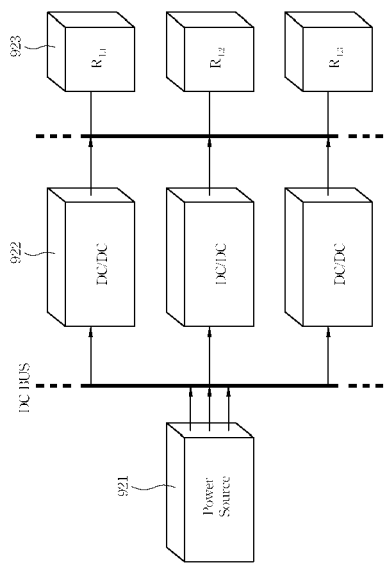
FIG. 2 is a system block diagram showing a conventional distributed power system.
Figure 1:
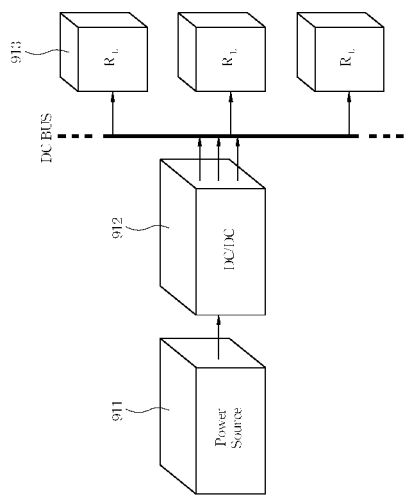
FIG. 1 is a system block diagram showing a conventional central power system.
Figure 4:
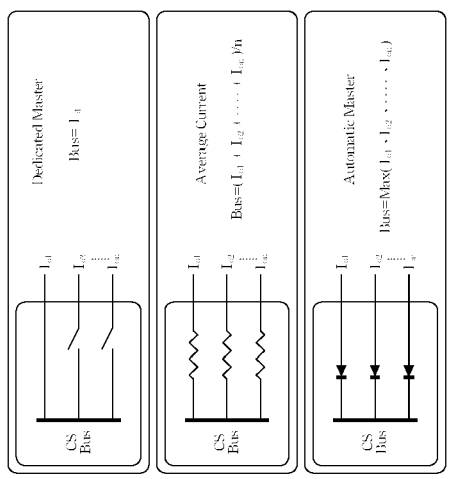
FIG. 4 shows several methods of using current sharing buses according to a first embodiment of the present invention.
Figure 3:
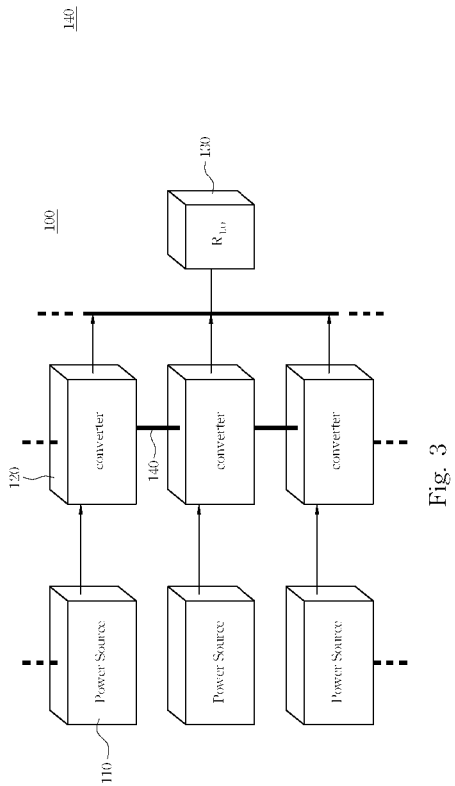
FIG. 3 is a system block diagram showing a power system according to a first embodiment of the present invention.
Figure 5:
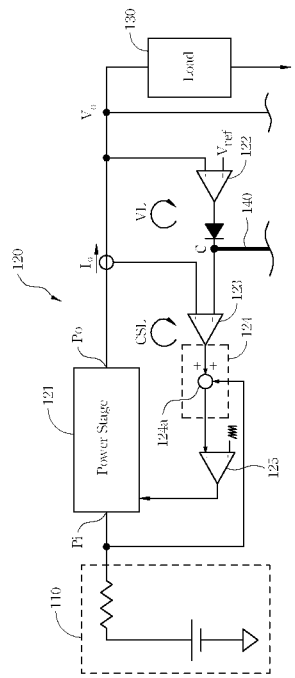
FIG. 5 is a circuit diagram showing a converter according to a first embodiment of the present invention.

Refer to FIG. 3 through FIG. 5. FIG. 3 is a system block diagram showing a power system according to a first embodiment of the present invention. FIG. 4 shows several methods of using current sharing buses according to a first embodiment of the present invention. FIG. 5 is a circuit diagram showing a converter according to a first embodiment of the present invention. The power system 100 of the first embodiment comprises a plurality of power sources 110, a plurality of converters 120, at least one load 130 and a plurality of sharing buses 140. The converters 120 are electrically connected to the power sources 110 respectively in a one-to-one manner for converting an input voltage to an output voltage. The load 130 is electrically connected to the converters 120. The sharing buses 140 are electrically connected between each pair of the adjacent converters 120 respectively for arranging the converters 120 connected in parallel and sharing controlling the converters 120, wherein the sharing buses 140 may be a plurality of current sharing buses or a plurality of voltage sharing buses.

Refer to FIG. 3 again. The power sources 110 of the first embodiment may be DC or AC power sources, such as manpower generators, solar cells, fuel cells, wind-power generators, thermal-power generators, water-power generators, conventional electric power generators or electric cell, to input the input voltage to the converters 120, thereby supplying power to the load 130 via the paralleling converters 120.

Refer to FIG. 3 and FIG. 4 again. The converters 120 of the first embodiment are electrically connected in parallel by the sharing buses 140. The converters 120 may be DC-to-DC, DC-to-AC, AC-to-DC or AC-to-AC converters for converting the input voltage (DC or AC) to the output voltage (DC or AC). The load 130 may be any device or apparatus actuated by electric power, such as a motor. Further, a single load 130 or more than two loads 130 may be used in the power system 100. In the embodiment, the sharing buses 140 may be formed by using the method such as dedicated master (DM) method, average current (AC) method, automatic master (AM) method or other suitable method, and the sharing control method may be an inner loop regulation (ILR), an outer loop regulation (OLR), a dual loop regulation (DLR), a single loop regulation (SLR) or other suitable method.

Refer to FIG. 5 again. For example, when the converters 120 of the first embodiment are DC-to-DC converters, and the sharing buses 140 may be the current sharing buses with the AM method, and the inner loop regulation (ILR) are employed in the power system 100, each of the compensator 122 and the sharing compensator 123 for providing a reference current at the node C, and the diode is used in the sharing buses 140 for using the automatic master method (AM). The sharing compensator 123 may be a differential amplifier which generates a current sharing signal in response to the reference current and the feedback signal at a positive terminal of the sharing compensator 123 and a sensing-current at a negative terminal of the current sharing compensator 123, and forms a current sharing loop CSL. In this embodiment, the current sharing loop CSL is formed prior to the voltage loop VL, thereby forming the inner loop regulation (ILR). The positive feed-forward control circuit 124 is electrically connected to the input terminal P, of the power stage circuit 121 to be electrically connected to one of the power sources 110 in a one-to-one manner, thereby positive feed-forward controlling the converters 120. The positive feed-forward control circuit 124 has a adder 124a for providing a feed-forward control signal in response to the current sharing signal from the sharing compensator 123 and an input reference signal from the input terminal P, of the power stage circuit 121, wherein the input reference signal may be a voltage signal or a current signal. The driver 125 is electrically connected between the power stage circuit 121 and the positive feed-forward control circuit 124 for driving the power stage circuit 121 according to the feed-forward control signal. Therefore, each of the converters 120 can be positive feed-forward controlled by the positive feed-forward control circuit 124.

It is worth mentioning that the positive feed-forward control circuit 124 uses the adder 124a to positive feed-forward control each of the converters 120, but not the conventional negative feed-forward control. Therefore, each of the converters 120 can output power corresponding to the power status of the power sources 110 connected thereto.

Figure 6:
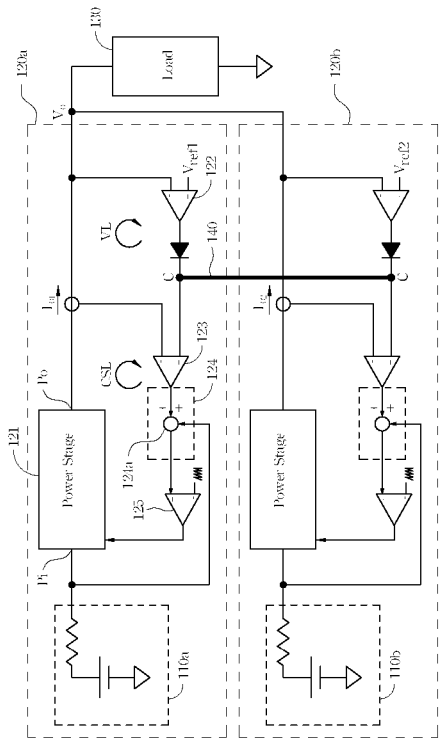
FIG. 6 is a circuit diagram showing a first converter and a second converter according to a first embodiment of the present invention.
Figure 7B:
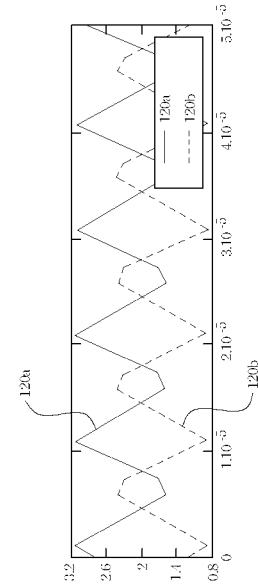
FIG. 7B is a graph showing the output current of a first converter and a second converter with the positive feed-forward control circuit according to a first embodiment of the present invention.
Figure 7A:
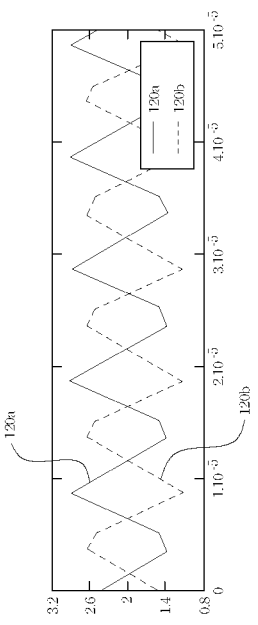
FIG. 7A is a graph showing the output current of a first converter and a second converter without the positive feed-forward control circuit according to a first embodiment of the present invention.

Refer to FIG. 6, FIG. 7A and FIG. 7B. FIG. 6 is a circuit diagram showing a first converter and a second converter according to a first embodiment of the present invention. FIG. 7A is a graph showing the output current of a first converter and a second converter without the positive feed-forward control circuit according to a first embodiment of the present invention. FIG. 7B is a graph showing the output current of a first converter and a second converter with the positive feed-forward control circuit according to a first embodiment of the present invention. When the converters 120 are electrically connected to the power sources 110 respectively in a one-to-one manner, for example, the converters 120 comprises a first converter 120a and a second converter 120b, and the first converter 120a and the second converter 120b are connected in parallel by the sharing buses 140, wherein the first converter 120a and the second converter 120b are connected to the different power sources 110 respectively. In comparison with the first converter 120a and the second converter 120b without the positive feed-forward control circuits 124, when the first converter 120a receives a first input voltage (such as 48 V) higher than a second input voltage (such as 38 V) received by the second converter 120b, i.e. the power source 110 connected to the first converter 120a can supply more power than the power source 110 connected to the second converter 120b, the first converter 120a having the positive feed-forward control circuits 124 can provide a first output current higher than a second output current provided by the second converter 120b. Therefore, the converters 120 are adapted to regulate the output current (or output voltage) supplied to the load 130 respectively according to the input status of each the power sources 110, i.e. the positive feed-forward control circuits 124 can avoid the low input voltage stage (the power source 110 connected to the second converter 120b) to achieve current sharing. For this reason, the more power capability each of the power sources 110 has, the more output power it can supply, so that poor one or failed one of the power sources 110 does not have to supply power as much as the other power sources 110. Thus, the power system 100 of the present embodiment can enhance power efficiency and life time thereof.

It is worth mentioning that the circuit structure of the embodiment is merely one example of the present invention. However, the present invention does not limit the circuit structure, and a person skilled in the art can use different kinds of circuit structure to achieve the same technical effect as the present invention.

Figure 8:
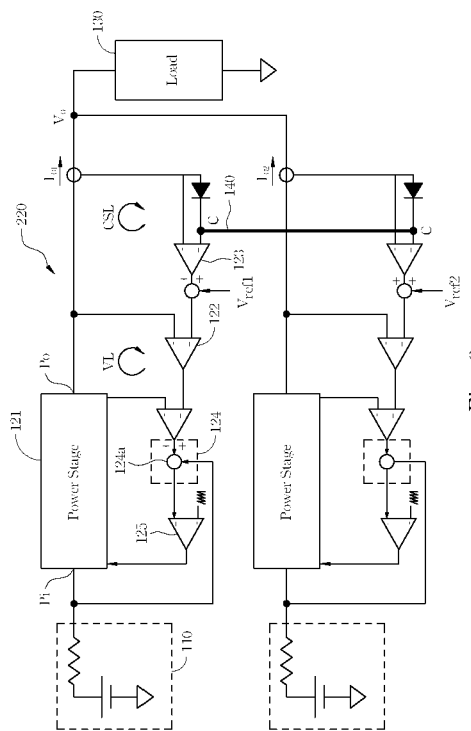
FIG. 8 is a circuit diagram according to a second embodiment of the present invention.

Refer to 8. FIG. 8 is a circuit diagram according to a second embodiment of the present invention. Some reference numerals shown in the first embodiment are used in the second embodiment of the present invention. The construction of the power system shown in the second embodiment is similar to that in the first embodiment with respect to configuration and function, and thus is not stated in detail herein.

Refer again to FIG. 8, in comparison with the first embodiment, the voltage compensator 122 of each of the converters 220 is prior to the sharing compensator 123, i.e. the voltage loop VL is formed prior to the current sharing loop CSL, thereby forming the outer loop regulation (OLR). Therefore, the converters 220 are positive feed-forward controlled by the positive feed-forward control circuits 124 to regulate the output current (or output voltage) supplied to the load 130 respectively according to the input status of each the power sources 110.

Figure 9:
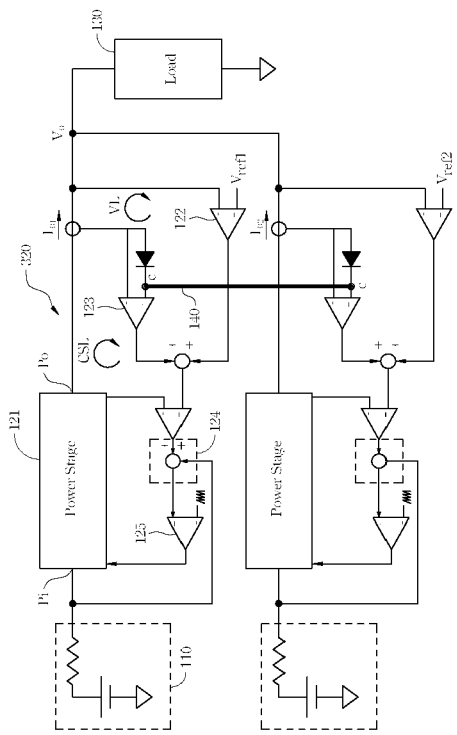
FIG. 9 is a circuit diagram according to a third embodiment of the present invention.

Refer to 9. FIG. 9 is a circuit diagram according to a third embodiment of the present invention. Some reference numerals shown in the first embodiment are used in the third embodiment of the present invention. The construction of the power system shown in the third embodiment is similar to that in the first embodiment with respect to configuration and function, and thus is not stated in detail herein.

Refer again to FIG. 9, in comparison with the first embodiment, the voltage compensator 122 and the sharing compensator 123 of each of the converters 320 are coupled in parallel, i.e. the voltage loop VL and the current sharing loop CSL of each of the converters 320 are connected in parallel, thereby forming the dual loop regulation (DLR). Therefore, the converters 320 are positive feed-forward controlled by the positive feed-forward control circuits 124 to regulate the output current (or output voltage) supplied to the load 130 respectively according to the input status of each of the power sources 110.

Figure 10:
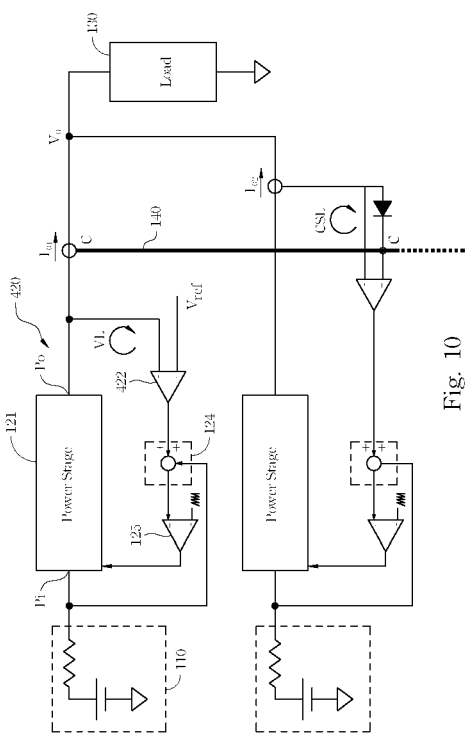
FIG. 10 is a circuit diagram according to a fourth embodiment of the present invention.

Refer to 10. FIG. 10 is a circuit diagram according to a fourth embodiment of the present invention. Some reference numerals shown in the first embodiment are used in the fourth embodiment of the present invention. The construction of the power system shown in the fourth embodiment is similar to that in the first embodiment with respect to configuration and function, and thus is not stated in detail herein.

Refer again to FIG. 10, in comparison with the first embodiment, a single compensator 422, such as a differential amplifier, is employed in each of the converters 420 to form the current sharing loop CSL or the voltage loop VL. Therefore, the converters 420 are positive feed-forward controlled by the positive feed-forward control circuits 124 to regulate the output current (or output voltage) supplied to the load 130 respectively according to the input status of each the power sources 110.

Figure 11:
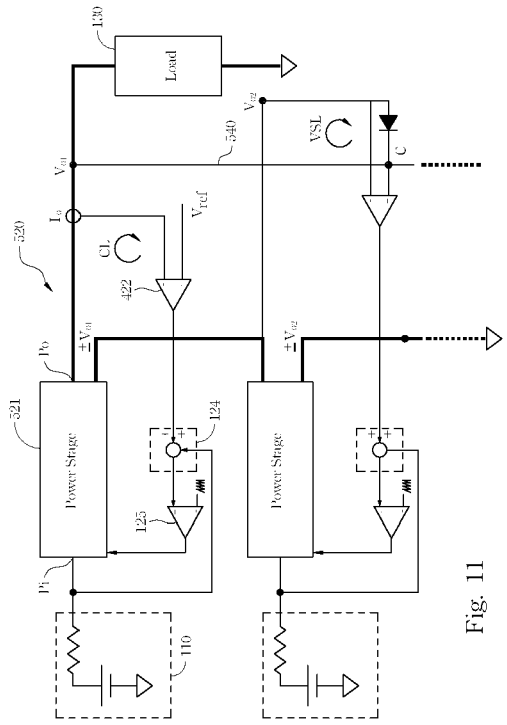
FIG. 11 is a circuit diagram according to a fifth embodiment of the present invention.

Refer to 11. FIG. 11 is a circuit diagram according to a fifth embodiment of the present invention. Some reference numerals shown in the fourth embodiment are used in the fifth embodiment of the present invention. The construction of the power system shown in the fifth embodiment is similar to that in the fourth embodiment with respect to configuration and function, and thus is not stated in detail herein.

Refer again to FIG. 11, in comparison with the fourth embodiment, the sharing buses 540 may be the voltage sharing buses for voltage sharing controlling the converters 520. At this time, the Current loop CL (for current compensation) and the voltage sharing loop VSL are formed in the converters 520. In this embodiment, each adjacent two of the power stage circuits 521 of the converters 520 is electrically connected, and each of the power stage circuits 521 is further electrically connected to load 130. Therefore, the converters 520 are positive feed-forward controlled by the positive feed-forward control circuits 124 to regulate the output current (or output voltage) supplied to the load 130 respectively according to the input status of each the power sources 110.

Figure 12:
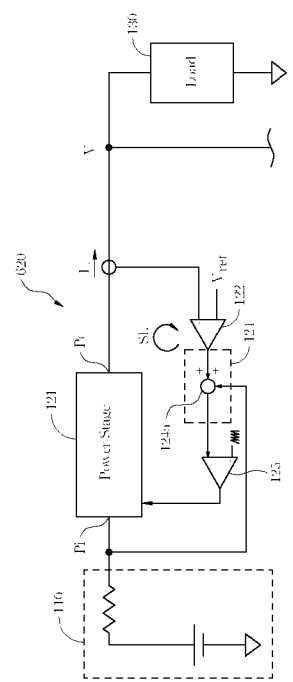
FIG. 12 is a circuit diagram according to a sixth embodiment of the present invention.

Refer to 12. FIG. 12 is a circuit diagram according to a sixth embodiment of the present invention. Some reference numerals shown in the first embodiment are used in the sixth embodiment of the present invention. The construction of the power system shown in the sixth embodiment is similar to that in the first embodiment with respect to configuration and function, and thus is not stated in detail herein.

Refer again to FIG. 12, in comparison with the first embodiment, the power system 100 of the sixth embodiment does not have the sharing buses 140 connected between each pair of the adjacent converters 620, and each of the converters 620 does not have the sharing compensator 123. However, each of the converters 620 are still adapted to regulate the output current (or output voltage) supplied to the load 130 respectively according to the input status of each the power sources 110. Therefore, the converters 620 are positive feed-forward controlled by the positive feed-forward control circuits 124 to regulate the output current (or output voltage) supplied to the load 130 respectively according to the input status of each the power sources 110.

Therefore, the power system shown in the respective embodiments of the present invention provide a plurality of power sources connected in parallel, so as to prevent the whole power system from not working when a single power source is poor or fails. Further, the converters are adapted to self-regulate the output current (or output voltage) supplied to the load respectively according to the input status of each the power sources, i.e. the power source with higher input status can supply more power to the load, and the power source with lower input status can avoid supplying too much power, thereby enhancing the power efficiency and life time of the power system.

As is understood by a person skilled in the art, the foregoing embodiments of the present invention are strengths of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A power system, comprising:
a plurality of power sources;
a plurality of converters electrically connected to the power sources respectively in a one-to-one manner, wherein each of the converters comprises:
a power stage circuit electrically connected to one of the power sources in a one-to-one manner to convert from an input voltage to an output voltage:
a positive feed-forward control circuit electrically connected to one of the power sources in a one-to-one manner for providing a feed-forward control signal to positive feed-forward control each of the converters;

a driver electrically connected between the power stage circuit and the positive feed-forward control circuit; and at least one load electrically connected to the converters, wherein the positive feed-forward control circuit has an adder connected to a positive terminal of the driver, and the drive outputs a driving signal to the power stage circuit according to the feed-forward control signal.

2. The power system as claimed in claim 1, wherein each of the converters further comprises:

a voltage compensator for generating a feedback signal in response to a sensing-voltage (Vsen) and a reference voltage (Vref) and forming a voltage loop.

3. The power system as claimed in claim 2, further comprising:

a plurality of sharing buses electrically connected between each pair of the adjacent converters respectively.

4. The power system as claimed in claim 3, wherein the sharing buses are a plurality of current sharing buses.

5. The power system as claimed in claim 3, wherein the sharing buses are a plurality of voltage sharing buses.

6. The power system as claimed in claim 3, wherein the sharing buses are formed using a dedicated master (DM) method.

7. The power system as claimed in claim 3, wherein the sharing buses are formed using an average current (AC) method.

8. The power system as claimed in claim 3, wherein the sharing buses are formed using an automatic master (AM) method.

9. The power system as claimed in claim 3, wherein each of the converters further comprises:

a sharing compensator for generating a sharing signal and forming a sharing loop.

10. The power system as claimed in claim 9, wherein the sharing loop is formed prior to the voltage loop, thereby forming an inner loop regulation (ILR).

11. The power system as claimed in claim 9, wherein the voltage loop is formed prior to the sharing loop, thereby forming an outer loop regulation (OLR).

12. The power system as claimed in claim 9, wherein the voltage loop and the sharing loop are electrically connected in parallel, thereby forming a dual loop regulation (DLR).

13. The power system as claimed in claim 1, wherein the power sources are DC or AC power sources.

14. The power system as claimed in claim 1, wherein the power sources are selected from a group consisting of manpower generators, solar cells, fuel cells, wind-power generators, thermal-power generators, water-power generators, electric power generators and electric cell.

15. The power system as claimed in claim 1, wherein the converters are DC-to-DC, DC-to-AC, AC-to-DC or AC-to-AC converters.

16. A set of converters, the set comprising:

a plurality of converters electrically connected between a plurality of power sources and at least one load, wherein the converters are electrically connected to the power sources respectively in a one-to-one manner, and each of the converters comprises:

a power stage circuit electrically connected to one of the power sources in a one-to-one manner to convert from an input voltage to an output voltage;

a voltage compensator for generating a feedback signal in response to a sensing-voltage (Vsen) and a reference voltage (Vref) and forming a voltage loop;

a positive feed-forward control circuit electrically connected to one of the power sources in a one-to-one manner for providing a feed-forward control signal to positive feed-forward control each of the converters; and a driver electrically connected between the power stage circuit and the positive feed-forward control circuit, wherein the positive feed-forward control circuit has an adder connected to a positive terminal of the driver, and the drive outputs a driving signal to the power stage circuit according to the feed-forward control signal.

17. The set of converters as claimed in claim 16, further comprising:

a plurality of sharing buses electrically connected between each pair of the adjacent converters respectively.

18. The set of converters as claimed in claim 17, wherein the sharing buses are a plurality of current sharing buses.

19. The set of converters as claimed in claim 17, wherein the sharing buses are a plurality of voltage sharing buses.

20. The set of converters as claimed in claim 17, wherein the sharing buses are formed using a dedicated master (DM) method.

21. The set of converters as claimed in claim 17, wherein the sharing buses are formed using an average current (AC) method.

22. The set of converters as claimed in claim 17, wherein the sharing buses are formed using an automatic master (AM) method.

23. The set of converters as claimed in claim 17, wherein each of the converters further comprises:

a sharing compensator for generating a sharing signal and forming a sharing loop.

24. The set of converters as claimed in claim 23, wherein the sharing loop is formed prior to the voltage loop, thereby forming an inner loop regulation (ILR).

25. The set of converters as claimed in claim 23, wherein the voltage loop is formed prior to the sharing loop, thereby forming an outer loop regulation (OLR).

26. The set of converters as claimed in claim 23, wherein the voltage loop and the sharing loop are electrically connected in parallel, thereby forming a dual loop regulation (DLR).

27. The set of converters as claimed in claim 16, wherein the power sources are DC or AC power sources.

28. The set of converters as claimed in claim 16, wherein the power sources are selected from a group consisting of manpower generators, solar cells, fuel cells, wind-power generators, thermal-power generators, water-power generators, electric power generators and electric cell.

29. The set of converters as claimed in claim 16, wherein the converters are DC-to-DC, DC-to-AC, AC-to-DC or AC-to-AC converters.

30. A method for controlling a power system, comprising:

providing a plurality of power sources and a power stage circuit;

electrically connecting a plurality of converters between the power sources and at least one load, wherein the converters are electrically connected to the power sources respectively in a one-to-one manner; and positive feed-forward controlling each of the converters by using a positive feed-forward control circuit electrically connected to one of the power sources in a one-to-one manner, wherein the positive feed-forward control circuit has an adder connected to a positive terminal of a driver, and the driver outputs a driving signal to the power stage circuit according to a feed-forward control signal outputted from the positive feed-forward control circuit.

31. The method for controlling the power system as claimed in claim 30, wherein the power stage circuit is electrically connected to one of the power sources in a one-to-one manner to convert from an input voltage to an output voltage, and the driver is electrically connected between the power stage circuit and the positive feed-forward control circuit for driving the power stage circuit according to the feed-forward control signal.

32. The method for controlling the power system as claimed in claim 31, wherein each of the converters further comprises:
    a voltage compensator for generating a feedback signal in response to a sensing-voltage (Vsen) and a reference voltage (Vref) and forming a voltage loop.

33. The method for controlling the power system as claimed in claim 32, further comprising:
    sharing controlling the converters by using the a plurality of sharing buses electrically connected between each pair of the adjacent converters to generate a sharing signal respectively.

34. The method for controlling the power system as claimed in claim 33, wherein the sharing buses are a plurality of current sharing buses.

35. The method for controlling the power system as claimed in claim 33, wherein the sharing buses are a plurality of voltage sharing buses.

36. The method for controlling the power system as claimed in claim 33, wherein the sharing buses are formed using a dedicated master (DM) method.

37. The method for controlling the power system as claimed in claim 33, wherein the sharing buses are formed using an average current (AC) method.

38. The method for controlling the power system as claimed in claim 33, wherein the sharing buses are formed using an automatic master (AM) method.

39. The method for controlling the power system as claimed in claim 33, wherein each of the converters further comprises:
    a sharing compensator for generating a sharing signal and forming a sharing loop.

40. The method for controlling the power system as claimed in claim 39, wherein the sharing loop is formed prior to the voltage loop, thereby forming an inner loop regulation (ILR).

41. The method for controlling the power system as claimed in claim 39, wherein the voltage loop is formed prior to the sharing loop, thereby forming an outer loop regulation (OLR).

42. The method for controlling the power system as claimed in claim 39, wherein the voltage loop and the sharing loop are electrically connected in parallel, thereby forming a dual loop regulation (DLR).

43. The method for controlling the power system as claimed in claim 30, wherein the power sources are DC or AC power sources.

44. The method for controlling the power system as claimed in claim 30, wherein the power sources are selected from a group consisting of manpower generators, solar cells, fuel cells, wind-power generators, thermal-power generators, water-power generators, electric power generators and electric cell.

45. The method for controlling the power system as claimed in claim 30, wherein the converters are DC-to-DC, DC-to-AC, AC-to-DC or AC-to-AC converters.

* * * * *